United States Patent
Shioya et al.

(12)

(10) Patent No.: US 6,191,178 B1
(45) Date of Patent: Feb. 20, 2001

(54) POLYCARBONATE RESIN FOAM AND SHOCK ABSORBER USING THE SAME

(75) Inventors: Satoru Shioya, Kawachi-gun; Mitsuru Shinohara, Utsunomiya; Akinobu Hira, Utsunomiya; Hisao Tokoro, Utsunomiya, all of (JP)

(73) Assignee: JSP Corporation (JP)

( * ) Notice: Under 35 U.S.C. 154(b), the term of this patent shall be extended for 0 days.

(21) Appl. No.: 09/601,236

(22) PCT Filed: Jan. 20, 1999

(86) PCT No.: PCT/JP99/00192

§ 371 Date: Jul. 31, 2000

§ 102(e) Date: Jul. 31, 2000

(87) PCT Pub. No.: WO99/40149

PCT Pub. Date: Dec. 8, 1999

(30) Foreign Application Priority Data

Feb. 3, 1998 (JP) .................................................... 10-36824
Jul. 27, 1998 (JP) .................................................... 10-211147

(51) Int. Cl.$^7$ .............................. C08J 9/228; C08J 9/232
(52) U.S. Cl. ............................................... 521/50; 521/182
(58) Field of Search ........................................ 521/60, 182

(56) References Cited

U.S. PATENT DOCUMENTS

| 4,504,534 | * | 3/1985 | Adachi et al. | 521/60 |
|---|---|---|---|---|
| 4,645,249 | * | 2/1987 | Nagoshi et al. | 521/60 |
| 4,657,937 | * | 4/1987 | Kuwabara et al. | 521/60 |
| 4,908,393 | * | 3/1990 | Arai et al. | 521/60 |
| 4,929,645 | * | 5/1990 | Nagoshi et al. | 521/60 |
| 4,937,271 | * | 6/1990 | Nagoshi et al. | 521/60 |
| 5,032,620 | * | 7/1991 | Arai et al. | 521/60 |

FOREIGN PATENT DOCUMENTS

| 47-43183 | 10/1972 | (JP) . |
|---|---|---|
| 57-22943 | 2/1982 | (JP) . |
| 6-55651 | 3/1994 | (JP) . |
| 6-57026 | 3/1994 | (JP) . |
| 11-28739 | 8/1999 | (JP) . |

* cited by examiner

Primary Examiner—Morton Foelak
(74) Attorney, Agent, or Firm—Lorusso & Loud

(57) ABSTRACT

A polycarbonate resin foamed molding having a density D of 0.6 g/cm$^3$ or less and at least 30 (kg·cm/cm$^3$)/(g/cm$^3$) of a value $E_{80}/D$ obtained by dividing an amount of energy absorbed through 50% compression of the molding at 80° C. ($E_{80}$ kg·cm/cm$^3$) by the density of the molding. A shock absorber for a vehicle includes a core of the above molding, and a skin covering a surface of the core.

4 Claims, No Drawings

POLYCARBONATE RESIN FOAM AND SHOCK ABSORBER USING THE SAME

TECHNICAL FIELD

This invention relates to a polycarbonate resin foamed molding and to a shock absorber for vehicles using same.

BACKGROUND ART

Polyurethane foams, moldings of polystyrene resin expanded particles (hereinafter referred to also as EPS) and moldings of polypropylene resin expanded particles (hereinafter referred to also as EPP) have been hitherto utilized as shock absorbers, such as bumpers, for automobiles. EPP is superior to a polyurethane foam with respect to adaptability for recycling and lightness in weight and is superior to EPS with respect to heat resistance and solvent resistance. However, EPP has a problem because shock absorbing characteristics thereof are poor at high and low temperatures, though it exhibits good shock absorbing properties at about 20° C.

JP-A-H2-158441 proposes the use of a molding of 1-butene-propylene random copolymer resin expanded particles for the purpose of improving the heat resistance of EPP. The shock absorbing efficiency of such a molding at high temperatures is, however, still fully unsatisfactory.

DISCLOSURE OF THE INVENTION

In view of the above problems of prior arts, the present invention provides a polycarbonate resin foamed molding having a density of D g/cm$^3$ and absorbing an energy of $E_{80}$ kg·cm/cm$^3$ when compressed to 50% at 80° C., wherein said density D and energy $E_{80}$ meet with the following conditions:

$$D \leq 0.6 \; E_{80}/D \geq 30.$$

In another aspect, the present invention provides a shock absorber comprising a core of the above molding, and a skin layer covering a surface of said core.

In the present specification and claims, the amount of energy absorbed, $E^{80}$ (kg·cm/cm$^3$), of a molding in 50% compression at 80° C. is a total of the compression stress applied to the molding up to the 50% compression strain and is obtained as an integrated value (area), from 0% strain to the 50% strain, of a compression stress-compression strain curve thereof.

The polycarbonate resin foamed molding according to the present invention (hereinafter also referred to as PC foamed molding) may be prepared by (1) a method in which a foamable molten mixture, obtained by melting and kneading a polycarbonate resin and a blowing agent, is injected into a mold having a desired shape to form a foamed molding with a desired shape (examples of such a foam molding method include those disclosed in JP-B-S47-31694, JP-A-S54-22469 and Japanese patent application No. H9-199279), (2) a method in which a foamable molten mixture, obtained by melting and kneading a polycarbonate resin and a blowing agent, is extruded to a reduced pressure atmosphere to foam the mixture and in which the foamed mixture, while it still retains a foaming power, is fed to a mold for completion of the foam molding (examples of such a foam molding method include those disclosed in JP-A-S63-158229 and JP-A-S63-260416), and (3) a method in which poly carbonate resin expanded particles (hereinafter also referred to as PC expanded particles) are molded in a mold.

The polycarbonate resin has a structure of a polyester between carbonic acid with a glycol or a divalent phenol and preferably contains an aromatic group. Illustrative of suitable polycarbonate resins are aromatic polycarbonate resins obtained from a bisphenol, such as 2,2-bis(4-oxyphenyl) propane, 2,2-bis(4-oxyphenyl)butane, 1,1-bis(4-oxyphenyl) cyclohexane, 1,1-bis(4-oxyphenyl)butane, 1,1-bis(4-oxyphenyl)isobutane and 1,1-bis(4-oxyphenyl)ethane. These polycarbonate resins are preferred for reasons of high resistance to heat. The polycarbonate resin may be mixed with a resin such as an acrylic resin, a saturated polyester, an ABS resin, a styrene resin or a polyphenylene oxide resin.

As the blowing agent, there may be used a volatile organic blowing agent such as an aliphatic hydrocarbon, an alicyclic hydrocarbon, an aromatic hydrocarbon, an aliphatic alcohol, an aliphatic ketone or a halogenated hydrocarbon or an inorganic blowing agent such as carbon dioxide gas, nitrogen gas or air. Illustrative of aliphatic hydrocarbons are propane, n-butane, i-butane, n-pentane, i-pentane and hexane. Illustrative of alicyclic hydrocarbons are cyclobutane, cyclopentane and cyclohexane. Illustrative of aromatic hydrocarbons are benzene, toluene and xylene. Illustrative of aliphatic alcohols are methanol, ethanol and propanol. Illustrative of aliphatic ketones are acetone and methyl ethyl ketone. Illustrative of halogenated hydrocarbons are 1-chloro-1,1-difluoroethane, pentafluoroethane, 1,1,1,2-tetrafluoroethane and 1,1-difluoroethane. The above blowing agents may be used singly or in combination of two or more thereof. It is also possible to use different types of blowing agents, such as an inorganic blowing agent and a volatile blowing agent, together.

The amount of the blowing agent varies with the kind thereof and intended expansion ratio. In the latter case, since the density of the foamed body depends upon the expansion ratio, the amount of the blowing agent is determined by the desired density of the foamed body.

In the present invention, the above method (3) in which PC expanded particles are molded in a mold is most preferably used for the production of the PC foamed molding, because it is relatively easy to produce a foamed molding having a complicated shape and because a foamed molding having very uniform density is obtainable so that relatively uniform mechanical properties are obtained and, therefore, it is easier to realize high compression strengths and high shock absorbing performance as compared with foamed moldings prepared by other methods and having the same density.

The PC expanded particles may be prepared by expanding the above-described polycarbonate resin as a base resin using a blowing agent with the utilization of an impregnation pre-expanding method or an extrusion expansion method.

The impregnation pre-expanding method is a process in which resin particles having a desired size and impregnated with a blowing agent are heated with steam, etc. to obtain expanded particles.

The extrusion expansion method is a process in which a base resin and a blowing agent are kneaded in an extruder and the kneaded mass is expanded under a reduced pressure. Expanded particles are obtained by cutting strands into suitable lengths while they are extruded and expanded or after they have been extruded and expanded. Alternatively, the kneaded mass is extruded and expanded into a plate-like or sheet-like shape, followed by cutting into particles to obtain expanded particles.

In the present invention, the former impregnation pre-expanding method is preferably used because the expanded particles are free of cut surfaces as seen with the latter, extrusion expansion method and because a reduction of closed cell content during the preparation of the expanded particles is small.

In the preparation of PC expanded particles by the impregnation pre-expanding method, polycarbonate resin is first pelletized into a suitable size in view of impregnation of a blowing agent and filling within a mold. In this case, the polycarbonate resin suitably has a melt flow rate (MFR) of 3–15 g/10 minutes, preferably 4–10 g/10 minutes, according to JIS K 7210, test conditions 20. Among such polycarbonate resins, the use of a linear polycarbonate is preferred. When MFR is greater than 15 g/10 minutes, the closed cell content of the expanded particles is apt to be lowered. An MFR of below 3 g/10 minutes, on the other hand, requires excess pressure load on the extruder for pelletizing and, further, the closed cell content of the expanded particles is apt to be lowered.

Pellets obtained by the above pelletization suitably have an average weight of 0.5 to 6 mg, preferably 1 to 4 mg, per one pellet and a length to diameter ratio L/D of 0.5 to 2.0, preferably 0.8–1.2.

The pellets (resin particles) are then impregnated with a blowing agent in a pressure-resisting vessel, such as an autoclave. As the blowing agent, use of an inorganic blowing agent such as $CO_2$, $N_2$ or air, especially $CO_2$, is preferred. A dispersing medium is suitably used. As the dispersing medium, water is generally used.

Higher the impregnation temperature and impregnation pressure, the shorter becomes the impregnation time. However, an excessively high impregnation temperature is not preferable because the resin particles will undergo hydrolysis when water is used as a dispersing medium so that the expansion ratio and closed cell content of the resulting expanded particles become low. Thus, the impregnation is generally desirably carried out at 20–100° C., especially at 30–80° C. The impregnation pressure varies with the expansion ratio of the expanded particles but is generally in the range of 10–100 kg/cm$^2$G, more preferably 20–50 kg/cm$^2$G. The impregnation time is 1–12 hours, more preferably 1–8 hours. The amount of the blowing agent in the pellets (molar amount of the blowing agent impregnated in 1 kg of the resin particles) is 0.5–2.0 mol per 1 kg resin, preferably 0.8–1.8 mole per 1 kg resin.

The resin particles thus impregnated with the blowing agent are then heated with steam, etc. to expand same and to form expanded particles.

The pressure of steam for the expansion is preferably 2.5–4.5 kg/cm$^2$G, more preferably 3.0–4.0 kg/cm$^2$G. When the pressure is below 2.5 kg/cm$^2$G, the expansion ratio of the expanded particles will be excessively low. Too high a pressure above 4.5 kg/cm$^2$G will cause reduction of the closed cell content. For the purpose of producing a PC foamed molding having excellent shock absorbing performance, it is preferred that the expanded particles used for the production of the molding have a closed cell content of at least 85%, preferably at least 90%.

In order to obtain suitable PC foamed moldings in the present invention, it is essential that the expansion ratio of the PC expanded particles used in the impregnation pre-expanding method should be controlled at a low level. When PC expanded particles having a true density of less than 0.13 g/cm$^3$ is produced by one stage from non-expanded resin particles, the closed cell content thereof is considerably lowered, resulting in reduction of physical properties of PC foamed moldings. Namely, such expanded particles will cause a reduction of a value ($E_{80}/D$), obtained by dividing an amount energy ($E_{80}$) absorbed through 50% compression of the PC foamed molding at 80° C. by a density (D) of the PC foamed molding, to less than 30 (kg·cm/cm$^3$)/(g/cm$^3$).

When a PC foamed molding having a density of less than 0.08 g/cm$^3$ is to be obtained, it is generally desirable to use PC expanded particles having a true density of less than 0.16 g/cm$^3$. Thus, when a PC foamed molding having a density of less than 0.08 g/cm$^3$ is to be obtained, it is preferred that PC expanded particles having a density of at least 0.13 g/cm$^3$ and a high closed cell content be first prepared, that the thus obtained PC expanded particles be further impregnated with a blowing agent and expanded by heating, and that the resulting PC expanded particles having a density of less than 0.13 g/cm$^3$ and a high closed cell content be used. In this case, too, it is preferable to maintain the closed cell content at 85% or more, more preferably at least 90%, so that the PC foamed molding can show $E_{80}/D$ of at least 30 (kg·cm/cm$^3$)/(g/cm$^3$).

In this case, the impregnation pressure of less than 20 kg/cm$^2$G, more preferably 3–7 kg/cm$^2$G, is used. When the impregnation pressure is excessively high, the cell walls are crushed to increase an open cell content. The impregnation temperature is preferably not higher than 80° C., more preferably 10–60° C.

The "true density" of the expanded particles mentioned above is a value (W/Va) calculated by dividing the weight W of the expanded particles (measured up to the order of 1/100 g for a sample of about 5 g (4.5–5.5 g)) by the volume Va thereof (measured up to the order of 1/10 cm$^3$ by immersing the sample in water).

The expanded particles impregnated with a blowing agent in the pressure-resisting vessel are taken out therefrom and are heated with steam, etc. for further expansion of the particles. When the atmosphere and the expanded particles within the pressure-resisting vessel have not been fully cooled before the expanded particles are taken out of the pressure-resisting vessel, the blowing agent impregnated therein readily escapes therefrom, resulting in a reduction of the expansion power. To prevent such a reduction, the temperature of the atmosphere and the expanded particles within the pressure-resisting vessel at the time the expanded particles are taken out is preferably controlled to 40° C. or less, more preferably 30° C. or less. The reason for the above-mentioned preferability of the impregnation temperature of not higher than 80° C. is because a long cooling time is required when the temperature exceeds 80° C. The impregnation time is 0.5–40 hours, more preferably 1–8 hours.

The lower the expansion temperature, the smaller becomes the reduction of the closed cell content. The pressure of steam at the time of the expansion is preferably less than 3.5 kg/cm$^2$G, especially 2.5–3.0 kg/cm$^2$G. The amount of the blowing agent contained in the expanded particles just before the expansion (molar amount of the blowing agent impregnated in 1 kg of the expanded particles) is 0.5–2.0 mol per 1 kg resin, preferably 0.5–1.8 mole per 1 kg resin.

The thus obtained PC expanded particles are molded by conventionally known method to produce a PC foamed molding (the resulting molding will be also referred to as expanded particle molding).

In the present invention, a method in which the PC expanded particles are filled within a mold and further foamed by heating with steam to fuse and integrate the particles together and to obtain a PC foamed molding is preferably adopted. In this case, a molding having good appearance is obtainable when the PC expanded particles are previously impregnated with an inorganic gas by a pressure treatment with the inorganic gas. As the inorganic gas, $CO_2$, $N_2$ or air is suitably used. The use of $CO_2$ is especially preferred, because the treatment may be carried out within the shortest period of time. The impregnation time pressure is preferably 1.5–20 kg/cm²G, more preferably 2.0–5.0 kg/cm²G. When the impregnation pressure exceeds 20 kg/cm²G, the cell walls are apt to be crushed to increase an open cell content. The impregnation temperature is preferably not higher than 80° C., more preferably 10–60° C.

The expanded particles impregnated with the blowing agent in the pressure-resisting vessel are taken out therefrom, charged into a mold and heated with steam, etc. for molding. When the atmosphere and the expanded particles within the pressure-resisting vessel have not been fully cooled before the expanded particles are taken out of the pressure-resisting vessel, the blowing agent impregnated therein readily escapes therefrom, resulting in a reduction of the expansion power and failure to obtain a suitable molding. To prevent such a failure, the temperature of the atmosphere and the expanded particles within the pressure-resisting vessel at the time the expanded particles are taken out is preferably controlled to 40° C. or less, more preferably 30° C. or less. The reason for the above-mentioned preferability of the impregnation temperature of not higher than 80° C. is because a long cooling time is required when the temperature exceeds 80° C.

When $CO_2$ is used as the inorganic gas, the amount thereof is preferably 0.5–2.0 mol per 1 kg resin, more preferably 0.5–1.8 mole per 1 kg resin.

During the heat-molding stage, open cells increase in amount because of foaming of the PC expanded particles and, therefore, the closed cell content decreases. It is thus desirable to carry out the molding in such a manner that the inside volume of the mold be reduced, after having been filled with the PC expanded particles, to compress the PC expanded particles to the extent that the fusion between the particles is not adversely affected. Steam for molding is fed, while maintaining the PC expanded particles in such compressed conditions (under conditions in which the space between particles is decreased), to perform the molding such that the foaming ratio in the mold is not very high. The pressure of steam at the time of the molding is preferably 3.5–6.0 kg/cm²G, more preferably 4.0–5.0 kg/cm²G. The molding temperature (molding steam pressure) is desirably low so that the appearance of the PC foamed molding and the fusion between particles are not adversely affected.

The density D of the PC foamed molding is not greater than 0.6 g/cm³, more preferably not greater than 0.3 g/cm³. The density of a molding is a value (Ws/Vs) calculated by dividing the weight Ws of the molding (measured up to the order of 1/100 g) by the volume Vs thereof (measured up to the order of 1/10 cm³ by immersing the sample in water). When the density D exceeds 0.6 g/cm³, the lightness of the molding is lost. The lower limit of the density D is generally 0.001 g/cm³, and is preferably 0.08 g/cm³ from the standpoint of closed cell content and physical properties thereof.

The value ($E_{80}/D$) obtained by dividing an amount energy ($EB_{80}$) absorbed through 50% compression of the PC foamed molding at 80° C. by a density (D) of the PC foamed molding is at least 30 (kg·cm/cm³)/(g/cm³), more preferably 31–70 (kg·cm/cm³)/(g/cm³). When the value ($E_{80}/D$) is less than 30 (kg·cm/cm³)/(g/cm³), superiority of the molding to EPP with respect to energy absorption power at an elevated temperature is small.

The density of the foamed molding may be controlled by controlling the density of the expanded particles used and the degree of compression of the expanded particles filled in the mold.

The amount energy ($E_{80}$) absorbed through 50% compression of a PC foamed molding at 80° C. may be increased by preparing the PC foamed molding with a high closed cell content using a highly heat-resisting aromatic polycarbonate resin and, in addition, by fully removing the blowing agent (organic volatile blowing agent, $CO_2$, etc.), which serves to plasticize the polycarbonate resin, by evaporation from the PC foamed molding after the molding has been produced. In this manner, the amount of energy absorbed is increased so that the ratio of the amount of energy absorbed to the density of the molding is controlled within the predetermined range.

It is preferred that a value obtained by dividing $E_{80}$ of a PC foamed molding by an amount energy (hereinafter referred to simply as $E_{23}$) absorbed through 50% compression of the PC foamed molding at 23° C. be 0.6 or more. As the value approaches to 1 (generally, the value does not arrive at 1), the difference in the shock absorbing power of the PC foamed molding between at a high temperature and at an ambient temperature becomes advantageously small. When the value is less than 0.6, the superiority of the molding over EPP becomes small. From this point of view, the $E_{80}/E_{23}$ value of the foamed molding of the present invention is preferably at least 0.61, more preferably at least 0.65.

By using the above-described highly heat-resisting aromatic polycarbonate resin as a raw material for a PC foamed molding, the $E_{80}/E_{23}$ value of a PC foamed molding can be made 0.6 or more. Further, the closed cell content of the PC foamed molding is preferably at least 50%, more preferably at least 55%.

It is preferred that a value obtained by dividing $E_{23}$ of a PC foamed molding by an amount energy (unit: (kg·cm/cm³)/(g/cm³), hereinafter referred to also as $E_{-20}$) absorbed through 50% compression of the PC foamed molding at –20° C. be 0.45 or more. As the value approaches to 1 (generally, the value does not arrive at 1), the difference in the shock absorbing power of the PC foamed molding between at an ambient temperature and at a low temperature becomes advantageously small. When the value is less than 0.45, the superiority of the molding over EPP becomes small. From this point of view, the $E_{23}/E_{-20}$ value of the foamed molding of the present invention is preferably at least 0.6, more preferably at least 0.75.

By using the above-described highly heat-resisting aromatic polycarbonate resin as a raw material for a PC foamed molding, the $E_{23}/E_{-20}$ value of a PC foamed molding can be made 0.45 or more.

The thus obtained PC foamed molding having the above specific properties shows a high shock absorbing performance not only at ambient temperature but also at high and low temperatures and, therefore, is suitably used as a shock absorber for vehicles such as automobiles, for example as a bumper core or a pad for resisting to side shocks. The shock absorber for a vehicle generally includes a PC foamed molding and a skin material, made of, for example, a synthetic resin and covering the molding, and is extremely suitably used in places where the difference in temperature is great or where the temperature is high. Additionally, the PC foamed molding may be recycled upon being melted.

The present invention will be further described in detail by Examples.

EXAMPLE 1

As a polycarbonate resin (PC) IUPILON S1000 (MFR (JIS K 7210, Test Condition 20): 8 g/10 minutes) manufactured by Mitsubishi Engineering Plastics Inc. was used. The resin was melted in an extruder, extruded into strands and fed into water for rapid cooling, and then cut with a pelletizer to obtain pellets (resin particles) having an average weight of 2 mg per resin particle and L/D of 1. The resin particles (100 parts by weight) were charged in a 5 liter autoclave together with 300 parts by weight of water and $CO_2$ of 40 kg/cm$^2$G. The contents were stirred at 40° C. for 2 hours to impregnate $CO_2$ in the resin particles. After cooling to 25° C., the pressure was released to obtain $CO_2$-impregnated resin particles. After quickly removing water deposits, the resin particles were contacted with steam at 3.6 kg/cm$^2$G for 10 seconds and expanded to obtain expanded particles having a true density of 0.253 g/cm$^3$ and a closed cell content of 95%. The amount of $CO_2$ impregnated in the resin particles just before the heating with steam was 1.2 moles per 1 kg resin.

The expanded particles were then dried and pressure-treated with $CO_2$ of 5 kg/cm$^2$G at 23° C. for 4 hours to further impregnate the particles with $CO_2$.

The thus obtained PC expanded particles having $CO_2$ content of 1.2 moles per 1 kg resin were charged in a mold cavity having a volume of 50×180×180 mm, subjected to a purge treatment for 5 seconds with steam and then molded with steam at 5.0 kg/cm$^2$G for 15 seconds. After cooling, the molding was taken out from the mold, then aged at 60° C. for 24 hours and cooled to room temperature to obtain a PC foamed molding. The physical properties, namely density D, closed cell content CCR, $E_{-20}$, $E_{23}$ and $E_{80}$, of the PC foamed molding were as shown in Table 1.

EXAMPLE 2

$CO_2$-Impregnated resin particles were obtained in the same manner as described in Example 1 using the same resin as used in Example 1. After quickly removing water deposits, the resin particles were contacted with steam at 3.8 kg/cm$^2$G for 20 seconds and expanded to obtain expanded particles having a true density of 0.166 g/cm$^3$ and a closed cell content of 92%. The amount of $CO_2$ impregnated in the resin particles just before the heating with steam was 1.2 moles per 1 kg resin.

The expanded particles were then dried and pressure-treated with $CO_2$ of 5 kg/cm$^2$G at ambient temperature for 4 hours to further impregnate the particles with $CO_2$.

The thus obtained PC expanded particles having $CO_2$ content of 1.2 moles per 1 kg resin were charged in a mold cavity having a volume of 50×180×180 mm, subjected to a purge treatment for 5 seconds with steam and then molded with steam at 5.0 kg/cm$^2$G for 15 seconds. After cooling, the molding was taken out from the mold, then aged at 60° C. for 24 hours and cooled to room temperature to obtain a PC foamed molding. The physical properties of the PC foamed molding were as shown in Table 1.

EXAMPLE 3

Expanded particles having a true density of 0.307 g/cm$^3$ and a closed cell content of 94% were prepared in the same manner as that of Example 1 except that IUPILON E2000 (MFR (JIS K 7210, Test Condition 20): 4 g/10 minutes) manufactured by Mitsubishi Engineering Plastics Inc. was used as a polycarbonate resin. The amount of $CO_2$ impregnated in the resin particles just before the heating with steam was 1.2 moles per 1 kg resin.

The expanded particles were then dried and pressure-treated with $CO_2$ of 5 kg/cm$^2$G at ambient temperature for 4 hours to further impregnate the particles with $CO_2$.

The thus obtained PC expanded particles having $CO_2$ content of 1.2 moles per 1 kg resin were charged in a mold cavity having a volume of 50×180×180 mm, subjected to a purge treatment for 5 seconds with steam and then molded with steam at 5.6 kg/cm$^2$G for 15 seconds. After cooling, the molding was taken out from the mold, then aged at 60° C. for 24 hours and cooled to room temperature to obtain a PC foamed molding. The physical properties of the PC foamed molding were as shown in Table 1.

Comparative Example 1

As a polycarbonate resin IUPILON S1000 (MFR (JIS K 7210, Test Condition 20): 8 g/10 minutes) manufactured by Mitsubishi Engineering Plastics Inc. was used. The resin was melted in an extruder, extruded into strands and fed into water for rapid cooling, and then cut with a pelletizer to obtain pellets (resin particles) having an average weight of 2 mg per resin particle and L/D of 1. The resin particles (100 parts by weight) were charged in a 5 liter autoclave together with 300 parts by weight of water and $CO_2$ of 40 kg/cm$^2$G. The contents were stirred at 40° C. for 2 hours to impregnate $CO_2$ in the resin particles. After cooling to 25° C., the pressure was released to obtain $CO_2$-impregnated resin particles. After quickly removing water deposits, the resin particles were contacted with steam at 4.2 kg/cm$^2$G for 20 seconds and expanded to obtain expanded particles having a true density of 0.107 g/cm$^3$ and a closed cell content of 83%. The amount of $CO_2$ impregnated in the resin particles just before the heating with steam was 1.2 moles per 1 kg resin.

The expanded particles were then dried and pressure-treated with $CO_2$ of 5 kg/cm$^2$G at ambient temperature for 4 hours to further impregnate the particles with $CO_2$.

The thus obtained PC expanded particles having $CO_2$ content of 1.7 moles per 1 kg resin were charged in a mold cavity having a volume of 50×180×180 mm, subjected to a purge treatment for 5 seconds with steam and then molded with steam at 5.2 kg/cm$^2$G for 15 seconds. After cooling, the molding was taken out from the mold, then aged at 60° C. for 24 hours and cooled to room temperature to obtain a PC foamed molding. The physical properties of the PC foamed molding were as shown in Table 1.

Comparative Example 2

Expanded particles having a true density of 0.246 g/cm$^3$ and a closed cell content of 65% were prepared in the same manner as that of Example 1 except IUPILON S3000 (MFR (JIS K 7210, Test Condition 20): 18 g/10 minutes) manufactured by Mitsubishi Engineering Plastics Inc. was used as a polycarbonate resin. The amount of $CO_2$ impregnated in the resin particles just before the heating with steam was 1.2 moles per 1 kg resin.

The expanded particles were then dried and pressure-treated with $CO_2$ of 5 kg/cm$^2$G at ambient temperature for 4 hours to further impregnate the particles with $CO_2$.

The thus obtained PC expanded particles having $CO_2$ content of 1.2 moles per 1 kg resin were charged in a mold cavity having a volume of 50×180×180 mm, subjected to a purge treatment for 5 seconds with steam and then molded with steam at 5.0 kg/cm$^2$G for 15 seconds. After cooling, the molding was taken out from the mold, then aged at 60° C. for 24 hours and cooled to room temperature to obtain a PC foamed molding. The physical properties of the PC foamed molding were as shown in Table 1.

Comparative Example 3

Ethylene-propylene copolymer (calorific value for fusion: 82 J/g; ethylene content: 2.4% by weight; MFR (JIS K 7210, Test Condition 14): 10 g/10 minutes) melted in an extruder together with an expansion aid (zinc borate 0.05% by eight), extruded into strands and fed into water for rapid cooling, and then cut with a pelletizer to obtain resin particles (pellets) having an average weight of 2 mg per resin particle and L/D of 1.5. The resin particles (100 parts by weight) were charged in a 400 liter autoclave together with 300 parts by weight of water, 0.3 part by weight of kaolin and 0.004 part by weight of a surfactant (sodium dodecylbenzenesulfonate). The contents were maintained at 151° C. for 15 minutes with stirring and then heated to 156° C. Thereafter, air at 30 kg/cm²G was fed to the autoclave, and the contents in the autoclave were maintained at that temperature for 15 minutes. Then, while maintaining the equilibrium vapor pressure in the autoclave, one end of the autoclave was opened to discharge the contents into the atmosphere to obtain expanded particles having a true density of 0.185 g/cm³ and a closed cell content of 93%.

The expanded particles were charged in a mold cavity having a volume of 50×180×180 mm, subjected to a purge treatment for 5 seconds with steam and then molded with steam at 4.0 kg/cm²G for 10 seconds. After cooling, the molding was taken out from the mold, then aged at 60° C. for 24 hours and cooled to room temperature to obtain an ethylene-propylene copolymer foamed molding. The physical properties of the foamed molding were as shown in Table 1.

In the Examples and Comparative Examples, the physical properties of the expanded particles moldings are measured as follows.

Closed Cell Content S of Expanded Particles

Closed cell content of expanded particles is measured in accordance with the method described in ASTM-D2856-70. True volume of the expanded particles (displacement volume of specimen) Vx is measured using Air Comparison Pycnometer Type-930 manufactured by Toshiba Beckmann Inc. (The expanded particles were placed in a sample cup at a height of about 25 mm. The sample cup was a furnished accessory of the specific gravity meter and accommodated therein for measurement.) The closed cell content S (%) is calculated according to the formula below. Similar measurement is carried out for three different specimens and an average is calculated.

$$S(\%) = (Vx - W/\rho) \times 100 / (Va - W/\rho)$$

where

Vx: is a true volume (cm³) of the expanded particles measured according to the above method and corresponds to a sum of a volume of the resin constituting the expanded particles and a total volume of closed cells of the expanded particles;

Va: is an apparent volume (cm³) of the expanded particles determined by immersing in water the expanded particles that are used for the measurement;

W: is a total weight (g) of the expanded particles that are used for the measurement; and $\rho$: is a density (g/cm³) of the resin constituting the expanded particles.

Closed Cell Content CCR of Expanded Particle Molding

Closed cell content of an expanded particle molding is measured in accordance with the method described in ASTM-D2856-70. True volume of the expanded particles (displacement volume of specimen) Vy is measured using Air Comparison Pycnometer Type-930 manufactured by Toshiba Beckmann Inc. (Two cut samples cut from the expanded particle molding to have a size of 25 mm×25 mm×12 mm and having no skin portions of the molding were placed in a sample cup for measurement) The closed cell content CCR (%) is calculated according to the formula below. Similar measurement is carried out for three different specimens and an average is calculated.

$$CCR(\%) = (Vy - Ws/\rho) \times 100 / (Vm - Ws/\rho)$$

where

Vy: is a true volume (cm³) of the expanded particle molding measured according to the above method and corresponds to a sum of a volume of the resin constituting the expanded particle molding and a total volume of closed cells of the expanded particle molding;

Vm: is an apparent volume (cm³) of the expanded particle molding determined from the outer size of the expanded particle molding used for the measurement;

Ws: is a weight (g) of the expanded particle molding used for the measurement; and $\rho$: is a density (g/cm³) of the resin constituting the expanded particle molding.

Amount of Energy Absorbed through 50% Compression at 80° C. ($E_{80}$)

In accordance with Japanese Industrial Standard JIS Z0234, a rectangular parallelepiped sample having 6 cut surfaces with a size of 40 mm×40 mm and a thickness of 25 mm is allowed to stand at 80° C. for 24 hours and then compressed in the thickness direction at that temperature at a speed of 10 mm/minute, while measuring the compression stress. A total energy absorption through 50% strain $E_{80}$ (kg·cm/cm³) is a cumulative of the compression stress up to the 50% strain. From the results of the measurement, a curve of plots of the compression stress (ordinate, kg/cm²) against the compression strain (abscissa, %), as disclosed in United States Reissue Patent No. Re. 32,780, FIG. 1. is obtained. The amount of energy absorbed through 50% compression ($E_{80}$) is an integrated value (area) from 0% strain to the 50% strain in the curve.

Amount of Energy Absorbed through 50% Compression at 23° C. ($E_{23}$)

$E_{23}$ is obtained in the same manner as the measurement of $E_{80}$ except that a sample is allowed to stand at 23° C. for 24 hours and is compressed at that temperature.

Amount of Energy Absorbed through 50% Compression at −20° C. ($E_{-20}$)

$E_{-20}$ is obtained in the same manner as the measurement of $E_{80}$ except that a sample is allowed to stand at −20° C. for 24 hours and is compressed at that temperature.

The testing device used in the compression tests at each of the above temperatures was a universal tester "Tensilon UTM III-500" manufactured by Orientec Corporation.

TABLE 1

|  | Example | | | Comp. Ex. | | |
| --- | --- | --- | --- | --- | --- | --- |
|  | 1 | 2 | 3 | 1 | 2 | 3 |
| Resin | PC | PC | PC | PC | PC | EPP |
| D (g/cm³) | 0.165 | 0.113 | 0.188 | 0.074 | 0.170 | 0.115 |
| CCR (%) | 87 | 72 | 88 | 10 | 7 | 87 |
| $E_{-20}$ (kg · cm/cm³) | 12.0 | 5.7 | 19.2 | 2.4 | 7.0 | 13.6 |
| $E_{23}$ (kg · cm/cm³) | 9.9 | 5.2 | 16.5 | 2.0 | 5.9 | 5.3 |
| $E_{80}$ (kg · cm/cm³) | 8.1 | 3.5 | 12.8 | 1.4 | 3.9 | 2.3 |
| $E_{80}/D$ (kg · cm/cm³)(g/cm³) | 49 | 31 | 68 | 19 | 23 | 20 |

TABLE 1-continued

|  | Example | | | Comp. Ex. | | |
| --- | --- | --- | --- | --- | --- | --- |
|  | 1 | 2 | 3 | 1 | 2 | 3 |
| $E_{80}/E_{23}$ | 0.82 | 0.67 | 0.78 | 0.70 | 0.66 | 0.43 |
| $E_{23}/E_{-20}$ | 0.83 | 0.91 | 0.86 | 0.83 | 0.84 | 0.39 |

What is claimed is:

1. A polycarbonate resin foamed molding obtained by molding polycarbonate resin expanded particles in a mold, said molding having a density of D g/cm³ and absorbing an energy of $E_{80}$ kg·cm/cm³ when compressed to 50% at 80° C., wherein said density D and energy $E_{80}$ meet with the following conditions:

$$D \leq 0.6 \quad E_{80}/D \geq 30.$$

2. A molding as claimed in claim 1, and absorbing an energy of $E_{23}$ kg·cm/cm³ when compressed to 50% at 23° C., wherein said energy $E_{80}$ and energy $E_{23}$ meet with the following condition:

$$E_{80}/E_{23} \geq 0.6.$$

3. A molding as claimed in claim 1, and absorbing an energy of $E_{23}$ kg·cm/cm³ when compressed to 50% at 23° C. and absorbing an energy of $E_{-20}$ kg·cm/cm³ when compressed to 50% at −20° C., wherein said energy $E_{80}$ and energy $E_{-20}$ meet with the following condition:

$$E_{23}/E_{-20} \geq 0.45.$$

4. A shock absorber comprising a core of a molding according to claim 1, and a skin layer covering a surface of said core.

* * * * *